(12) United States Patent
Burns

(10) Patent No.: US 9,308,792 B2
(45) Date of Patent: Apr. 12, 2016

(54) TRACTION BAR AND RELATED METHODS

(71) Applicant: Michael D. Burns, Tehachapi, CA (US)

(72) Inventor: Michael D. Burns, Tehachapi, CA (US)

(*) Notice: Subject to any disclaimer, the term of this patent is extended or adjusted under 35 U.S.C. 154(b) by 0 days.

(21) Appl. No.: 14/230,640

(22) Filed: Mar. 31, 2014

(65) Prior Publication Data

US 2015/0273965 A1 Oct. 1, 2015

(51) Int. Cl.
*B60G 7/00* (2006.01)

(52) U.S. Cl.
CPC .......... *B60G 7/001* (2013.01); *B60G 2204/143* (2013.01); *B60G 2204/148* (2013.01); *B60G 2204/422* (2013.01); *B60G 2204/4302* (2013.01); *B60G 2204/4306* (2013.01); *B60G 2206/11* (2013.01)

(58) Field of Classification Search
CPC ...... B60G 7/001; B60G 9/00; B60G 2202/30; B60G 2202/315; B60G 2202/31; B60G 2202/312; B60G 2202/326; B60G 2202/341; B60G 2202/3415; B60G 2202/343; B60G 2202/433; B60G 2204/143; B60G 2204/62

USPC ......... 280/124.111, 124.11, 124.128; 267/66, 267/68; 180/345
See application file for complete search history.

(56) References Cited

U.S. PATENT DOCUMENTS

| 1,506,470 | A | * | 8/1924 | Whitcomb | 180/345 |
| 2,846,267 | A | * | 8/1958 | Fields | 298/20 A |
| 4,098,523 | A | * | 7/1978 | Valerio | 280/124.104 |
| 4,108,267 | A | * | 8/1978 | Valerio | 180/345 |
| 5,354,092 | A | * | 10/1994 | Calvert | 280/124.102 |
| 6,386,565 | B1 | * | 5/2002 | Kugler | 280/124.165 |
| 6,416,067 | B1 | * | 7/2002 | Kugler | 280/104 |
| 2002/0180170 | A1 | * | 12/2002 | Anderson | 280/124.128 |

* cited by examiner

*Primary Examiner* — Ruth Ilan
*Assistant Examiner* — Darlene P Condra
(74) *Attorney, Agent, or Firm* — Buche & Associates, P.C.; John K. Buche; Bryce A. Johnson

(57) ABSTRACT

Generally disclosed is a traction bar with a telescoping slider and related methods of use. The traction bar restricts wheel hop and axle wrap in vehicles and the traction bars telescoping slider allows the vehicle's suspension to maintain a full range of motion.

15 Claims, 7 Drawing Sheets

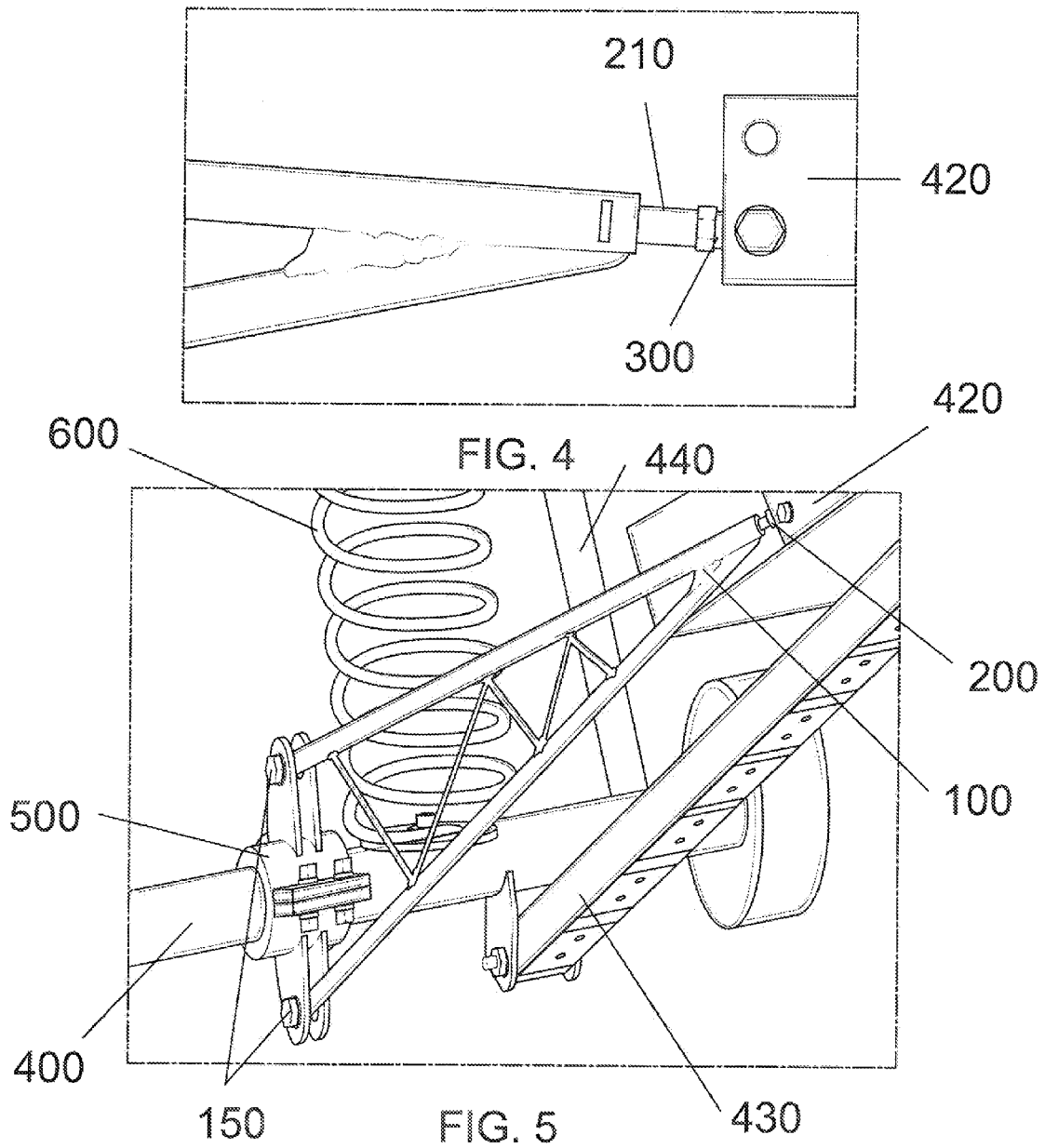

TRACTION BAR AND RELATED METHODS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of Invention

The present disclosure pertains to the field of traction bars for automobiles.

2. Background of the Invention

A vehicle's suspension is a system of springs (or other shock absorbers) and mechanical links that connects a vehicle's frame with its wheels (including axles). While the vehicle is moving, the suspension allows relative motion between the frame and wheels to isolate the vehicle's occupants from bumps and vibrations encountered by the wheels over the roadway. Suspensions have advanced to the point of vehicle occupants expecting a "smooth" and comfortable ride.

Despite the desirability of a smooth ride for a vehicle's occupants, relative motion between a vehicle's frame and wheels is not always wanted. In particular, certain rotational motions of the vehicle's axle housings relative to the vehicle's frame can be deleterious to the vehicle. Such unwanted relative rotational motion can occur when the torque applied through the vehicle's drive train for forward rotation of the vehicle's tires causes a corresponding twist of the axle housings in the opposite direction from tire rotation. This twist of the axle housings is known as "axle wrap." Although the vehicle's suspension deflects or absorbs some of the forces resulting from axle wrap, axle wrap nevertheless creates stresses that can damage the vehicle. Furthermore, when high torques are applied through the drive train (e.g., during towing or drag racing) axle wrap can overload the suspension to create another problem called wheel hop, which is a release of the overloaded forces in the form of a violent vertical action of the tires. During wheel hop, the tires jump off the ground so the tires can spin freely and when the tires meet the ground again, the drive axles and suspension are hit with increased torque and possibly repeated wheel hop.

It comes as no surprise that apparatuses have been developed to prevent axle wrap and wheel hop. One apparatus developed for this purpose is a traction bar or colloquially, a "t-bar." A t-bar is rigid bar that is mechanically connected between a vehicle's axle housings and frame to resist rotation of the drive axle housings relative to the frame. See, e.g., U.S. Pat. No. 3,788,629 by Johnson, which discloses a vehicle traction bar that prevents wheel hop. Although capable of resisting axle wrap and wheel hop, heretofore known t-bars restrict all relative motions, even desirable motions, between the vehicle's frame and wheels. This means that a t-bar sacrifices a smooth ride to avoid axle wrap or wheel hop.

In view of the foregoing, there exists a need for traction bars that restrict wheel hop and axle wrap, while still allowing a smooth ride (e.g., full range of motion in the vehicle's suspension. One attempt at such a traction bar is U.S. Pat. No. 7,918,469 by Hoppert. This traction bar is defined by a combination of a rear spring spacer block and a traction bar that eliminate wheel hop and axle wrap while maintaining a level vehicle drive height. The traction block features a traction bar that is pivotally coupled to a height selected set of spacer blocks that are positioned between the vehicle's spring assembly and axle mount. Hoppert's bar is configured to accommodate vehicles of different lengths but, in operation, the bar applies a rigid connection between the drive axle and the vehicle frame while allowing relative motion of the suspension. Hoppert's bar is not always a satisfactory solution to the above identified need because the bar replaces the vehicle's suspension instead of incorporating the existing suspension. Thus, a need still exists for a t-bar that restricts wheel hop and axle wrap, while still allowing full range of motion of the vehicle's existing suspension.

SUMMARY OF THE INVENTION

An objective of the present invention is to provide an improvement to traction bars for automotive vehicles. Traction bars, in general, are designed to prevent wheel hop and axle wrap in vehicles that, upon acceleration, exhibit a high amount of torque through the drive train. This traction bar is designed to not only prevent wheel hop and axle wrap, but it also does not interfere with the vehicle's original equipment and allows for a full range of motion of the vehicle's suspension through the configuration of the traction bar and the traction bar's use of a telescoping slider. When a vehicle accelerates and exerts a high amount of torque, the traction bar restricts wheel hop and axle wrap while being configured to slide along the telescopic slider to allow for a full range of motion of the vehicle's suspension.

Other objectives of the disclosure will become apparent to those skilled in the art once the invention has been shown and described.

BRIEF DESCRIPTION OF THE FIGURES

The manner in which these objectives and other desirable characteristics can be obtained is explained in the following description and attached drawings in which:

FIG. 4 is a side view of the point end of one embodiment of the traction bar with the slider in a "loaded" position when the vehicle is lowered and the vehicle's suspension coils are compressed.

FIG. 5 is n environmental view of one embodiment of the traction bar.

DETAILED DESCRIPTION OF PREFERRED EMBODIMENTS

Generally disclosed is a traction bar with a slider that does not interfere with the vehicle's original equipment and allows for full range of motion of the vehicle's suspension.

Figure 1:
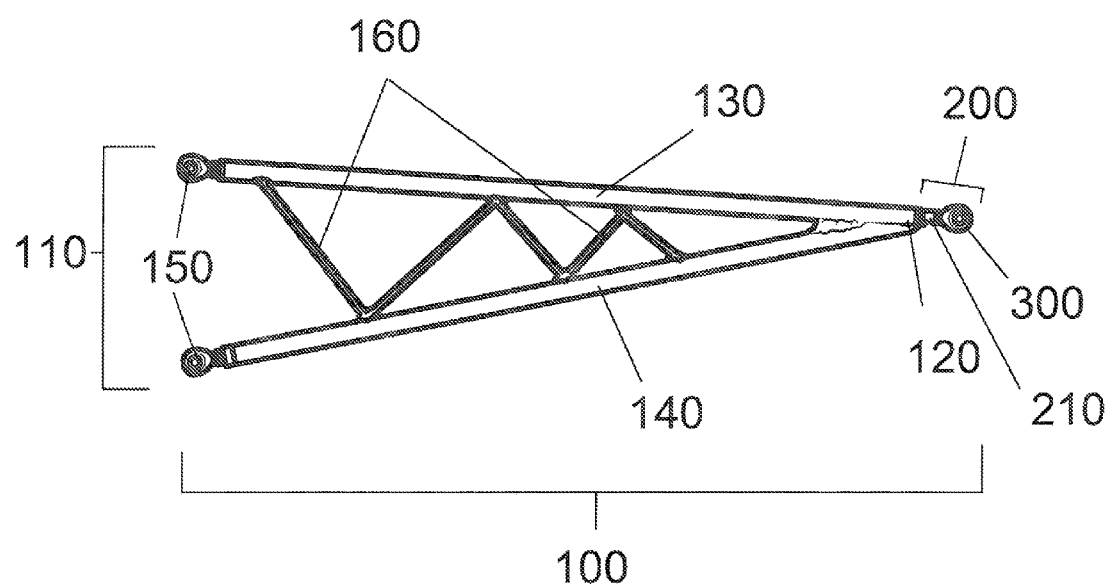
FIG. 1 is a side view of one embodiment of the traction bar.

FIG. 1 is side view of one embodiment of the traction bar 100 and the general components of the traction bar 100 can be seen. In use, the traction bar 100 consists of a V-shaped frame 110 with an upper arm 130 and a lower arm 140, wherein the upper arm 130 and the lower arm 140 converge and merge to form a point end 120. The upper arm 130 and lower arm 140 may also be supported by supporting arms 160 that are joined to the upper arm 130 and lower arm 140 at several points. The upper arm 130, lower arm 140, and supporting arms 160 may be composed of a high strength material, which may include any metals or composites. The V-shaped frame 110 also features two forked end fasteners 150, one on the upper arm 130 and one on the lower arm 140, which are coupled to a clamp 500 (See FIGS. 5 and 6). A clamp 500 may be defined by any securing device known to one skilled in the art such as a welded bracket. The forked end fasteners 150 are formed from a high strength rigid material such as stainless steel and have an orifice that receives fasteners such as nuts and bolts. The forked end fasteners 150 may be fixed to the upper arm 130 and lower arm 140 via a threading mechanism or any other methods that may be employed by one skilled in the art. The clamp 500 is securely coupled to a vehicle's rear axle housings 400 via rigid fasteners such nuts and bolts (See FIGS. 5 and 6).

In one embodiment, the point end 120 of the V-shaped frame 110 features a cylindrical opening, where a telescoping slider 200 is coaxially disposed in. The slider 200 features a fastening end 300 that is fixedly coupled to the vehicle's frame 410 via an attachment bracket 420 (See FIGS. 2, 3, 4 and 5). The telescoping slider 200 is defined by a cylindrical pipe 210 that moves through the point end 120 of the V-shaped frame 110 and within the upper arm 130 of the V-shaped frame 110.

Suitably, the upper arm's 130 forked end fastening end 150, is fixed at the rear at a higher level than the point end 120 and slider 200. The configuration of the upper arm 130 in relation to the lower arm 140 and slider 200 is important because if the height of the upper arm 130 at the forked end and rear axle housing 400 is the same as the height of the upper arm 130 at the slider 200, then the suspension would lock up. The configuration of the upper arm 130, in combination with the telescoping effect of the pipe 210, allows the vehicle's suspension to oscillate freely and it does not lock the vehicle's suspension like other traction bars.

Operably, as the vehicle's body moves downward and the vehicle's suspension coils 600 (See FIGS. 5 and 6) compress, the vehicle's trailing arm 430 (See FIGS. 5, 6, and 10) moves upward, which moves the rear end further away from the connection point at the frame. The vehicle's upper control arm 450 (See FIG. 10) is turning and stabilizing the rear end and keeping it aligned with the transmission. Meanwhile, the slide action of the traction bar 100 allows the vehicle's original upper control arm 450 to change the orientation of the axle and when the vehicle is lowered the visible slider 200 length increases. Conversely, when the vehicle is raised, the traction bar's 100 visible slider 200 length decreases. This configuration is important because if the traction bar 100 was rotated so that the upper arm 130 is on the bottom, then the traction bar 100 would lock up the vehicle's suspension, which is not the aim for the traction bar 100. Therefore, ideally, the traction bar 100 has an upper arm 130 that is attached at the forked end at a higher level than the slider 200 and a lower arm 140 forming a V-shape, so that the traction bar 100 does not lock up the vehicle's suspension.

Figure 2:
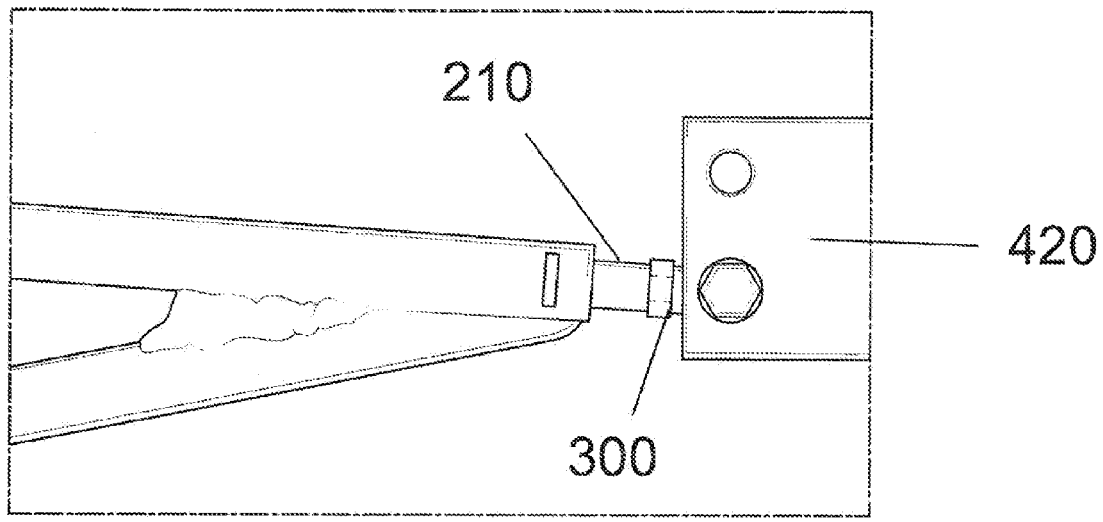
FIG. 2 is a side view of the point end of one embodiment of the traction bar with the slider in a "sitting" position when the vehicle's suspension is neither compressed nor extended.

FIG. 2 depicts one example of the slider's 200 pipe 210 in a "sitting" position. When the vehicle's suspension coils 600 (See FIGS. 5 and 6) are neither compressed nor extended, the pipe 210 is said to be in a "sitting" position. When the pipe 210 is in a "sitting" position, the pipe's 210 visible length may be approximately 1 inch. The visible length of the slider's 200 pipe 210 may vary from one embodiment to another and may vary based on the disposition of the vehicle's suspension at any point in time. Therefore, the visible length of the slider's 200 pipe 210 is not restricted to the measurements recited.

Figure 3:
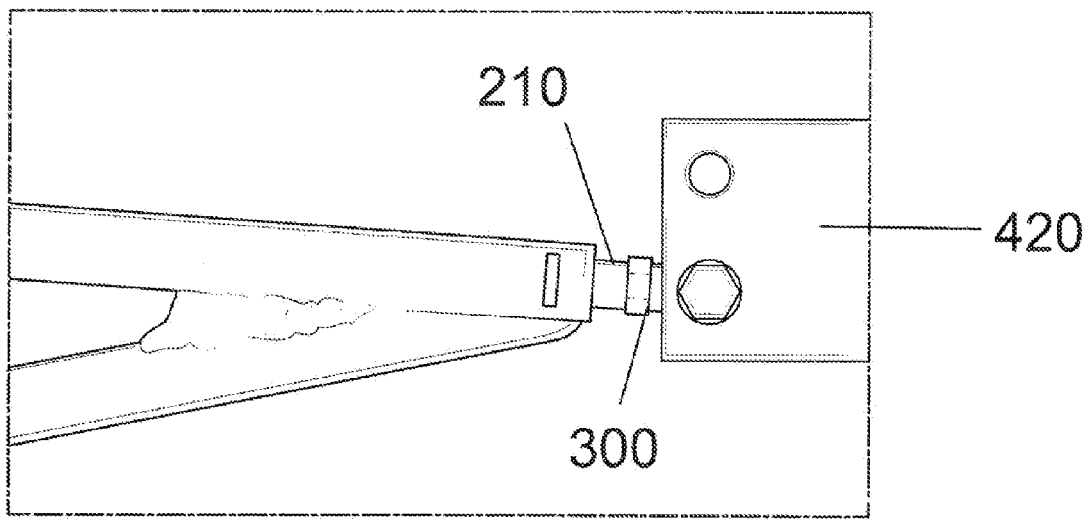
FIG. 3 is a side view of the point end of one embodiment of the traction bar with the slider in a "raised" position when the vehicle is raised.

FIG. 3 depicts the length of the pipe 210 when the vehicle's body is raised. As the vehicle's body is raised, the pipe 210 slides into point end's 120 opening and the length of the pipe 210 that is visible decreases. In one example, as the body is raised approximately 4 and ⅜ inches, the length of the pipe 210 that is exposed decreases to approximately ⅝ of an inch. The visible length of the slider's 200 pipe 210 may vary from one embodiment to another and may vary based on the disposition of the vehicle's suspension at any point in time. Therefore, the visible length of the slider's 200 pipe 210 is not restricted to the measurements recited.

FIG. 4 depicts length of the pipe 210 in a "loaded" position, which occurs when the vehicle's suspension coils 600 (See FIGS. 5 and 6) are compressed and the vehicle's body is lowered. In this example of a "loaded" position, the pipe's 210 visible length increases from approximately 1 inch to approximately an inch and a half. That is to say, as the vehicle's body lowers, the pipe 210 length that is visible becomes greater. The visible length of the slider's 200 pipe 210 may vary from one embodiment to another and may vary based on the disposition of the vehicle's suspension at any point in time. Therefore, the visible length of the slider's 200 pipe 210 is not restricted to the measurements recited.

FIG. 5 depicts a front view of one embodiment of the traction bar 100 fixedly coupled to the rear axle housing 400 of a vehicle via a clamp 500. Ideally, also attached to the rear axle housing 400 are two trailing arms 430, two upper control arms 450 which attach the axle housings 400 and center section 460 to the vehicle's frame 410, suspension coils 600, and shock absorbers 440 (See FIG. 10). The shock absorbers 440 and suspension coils 600 play an integral role in the vehicle's suspension and are manipulated when the vehicle is in a raised or lowered state. In use, one embodiment of the traction bar 100 may be installed on a vehicle via fastening the forked end fasteners 150 of the V-shaped frame 110 to a clamp 500, which is securely coupled to the vehicle's rear axle housing 400. The point end 120 receives the slider 200, which is fastened to the vehicle's frame 410 via an attachment bracket 420. The slider 200 is coupled to the attachment bracket 420 via the fastening end 300 of the slider 200. The fastening end 300 has a fastener receiver 310 that is coupled to the attachment bracket 420, which is fixed to the vehicle's frame 410. The fastener receiver 310 may be coupled to the attachment bracket 420 through the use of rigid fastening members, such as nuts and bolts.

Figure 6:
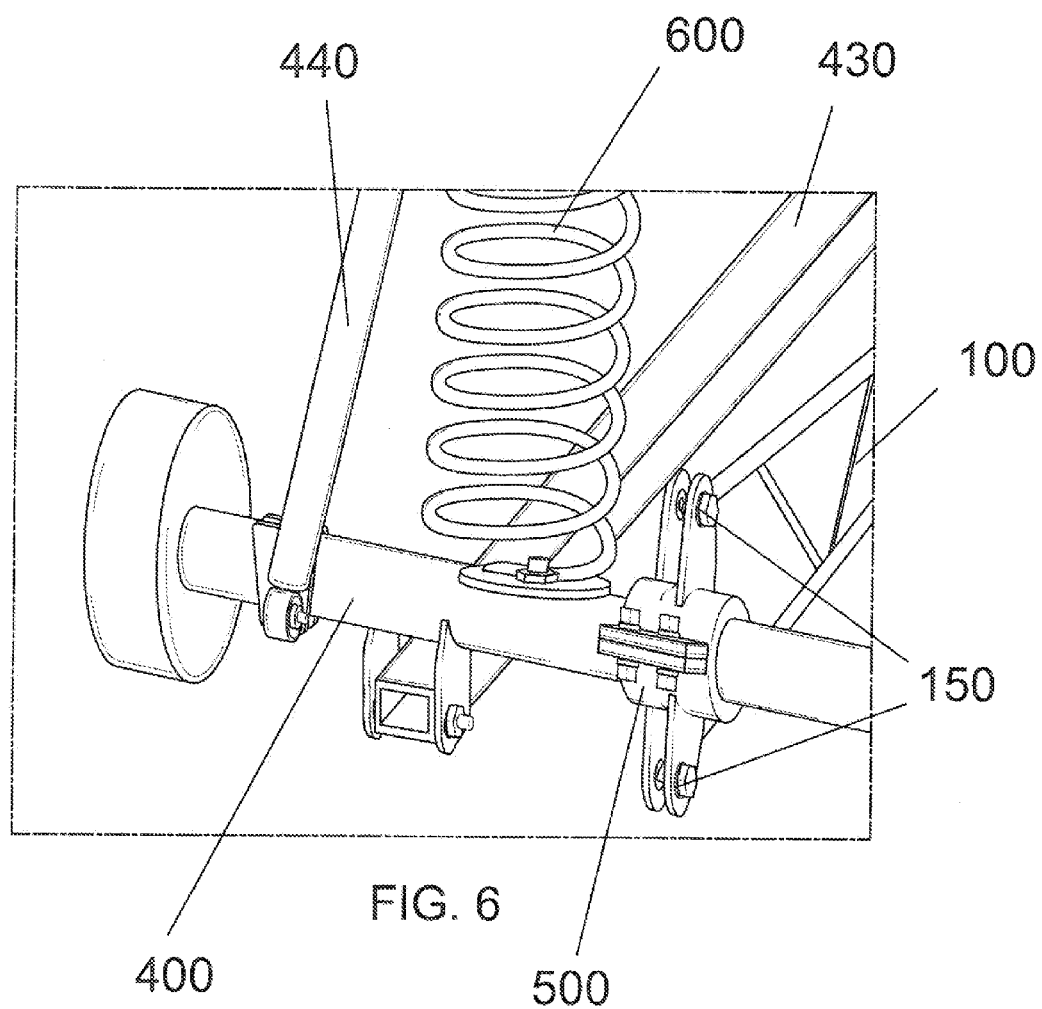
FIG. 6 is a perspective view of one embodiment of the traction bar.

FIG. 6 depicts a rear view of one embodiment of the traction bar 100 fixed to the rear axle housing 400 of a vehicle via a clamp 500. Preferably, also attached to the rear axle housing 400 and center section 460 are two trailing arms 430, two upper control arms 450, suspension coils 600, and shock absorbers 440 (See FIG. 10).

Figure 7:
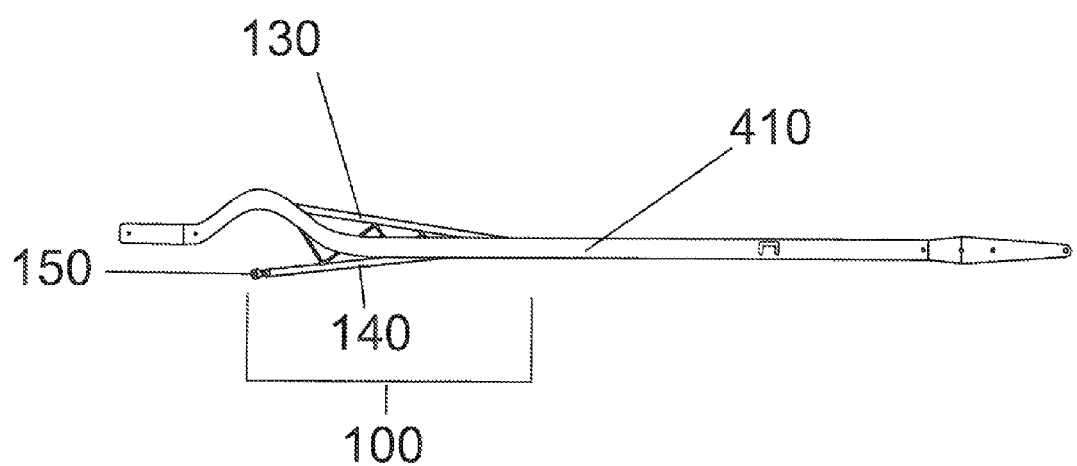
FIG. 7 is a side view of one embodiment of the traction bar.

FIG. 7 depicts a side view of the traction bar 100 situated behind the vehicle's frame 410. The traction bar 100 may be composed of a variety of high strength material. Suitably, the attachment bracket 420 (See FIGS. 2, 3, 4, and 5) and slider 200 of the traction bar 100 are parallel to the vehicle's frame 410.

Figures 8, 9:
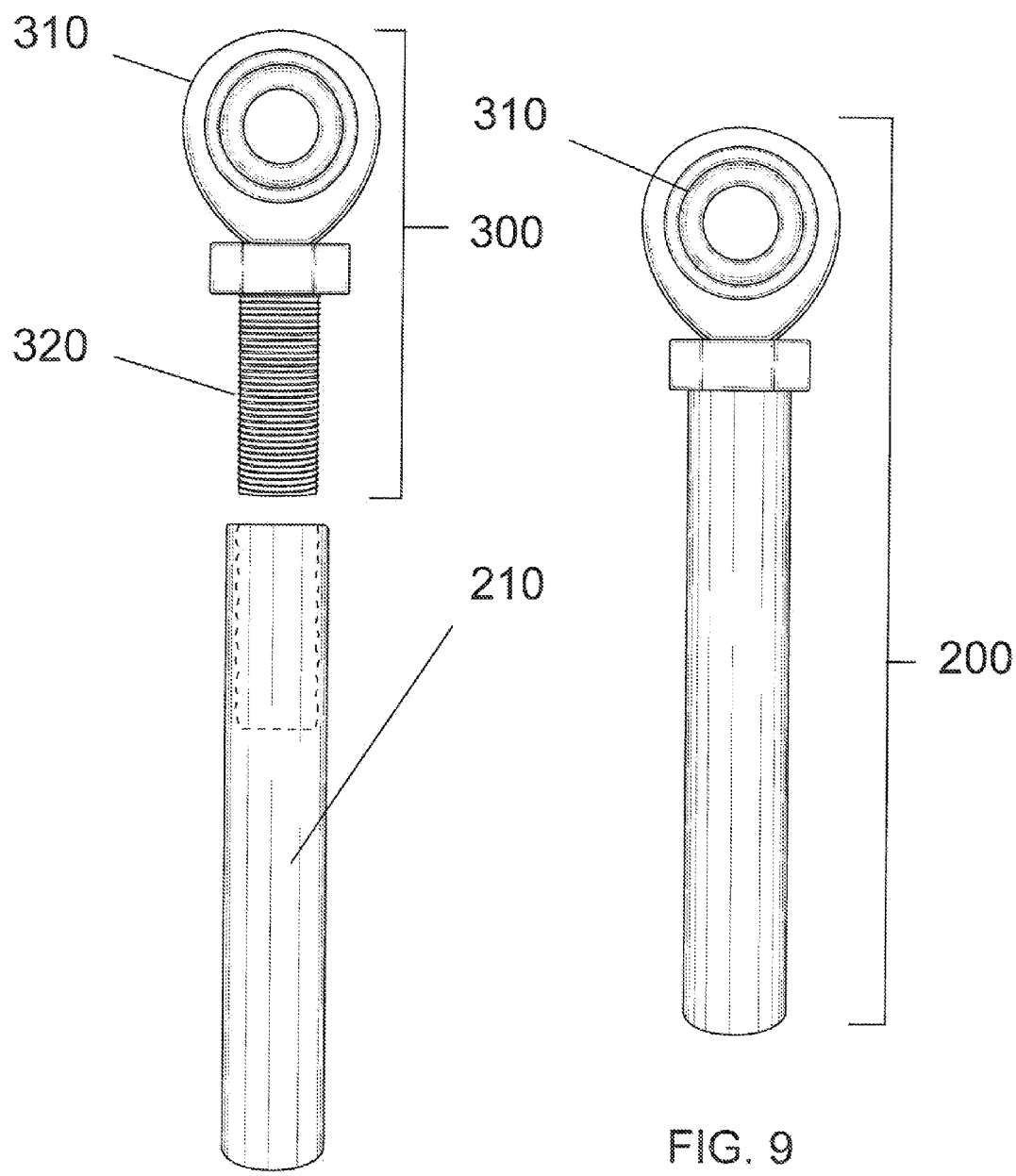
FIG. 8 is a front view of one embodiment of the slider with the pipe and the fastening end unattached.
FIG. 9 is a front view of one embodiment of the slider with the pipe attached to the fastening end.

FIG. 8 is one embodiment of a disassembled slider 200. The slider 200 is composed of a fastening end 300, which features a first end fastening receiver 310 and a second end threaded rod 320, as well as a pipe 210 with a first end and a second end. The first end of the pipe 210 is threaded on the inside (See FIG. 8's jagged dotted lines). A fastening end 300 is affixed to the pipe 210 by threading the threaded rod 320 of the fastening end 300 into the corresponding first end of the pipe 210. The pipe 210 on the slider 200 may be approximately 5 inches and is coaxially disposed into the point end's 120 opening, which allows for movement of the slider 200 along the traction bar 100 so that the vehicle's suspension may be able to move freely.

FIG. 9 depicts one embodiment of the assembled slider 200. The pipe 210 of the slider 200 has a smaller circumference than the opening of the point end 120 of the V-shaped frame 110. The pipe 210 is coaxially disposed into the point end's 120 opening, wherein the pipe 210 of the slider 200 is able to slide within and along the point end 120 of the V-shaped frame 110 and upper arm 130.

The slider 200 can be composed of a variety of materials known to one skilled in the art, for example, a solid stock of metal or composites. The slider 200 can be attached via a variety of methods known to one skilled in the art, for example, it can be partially drilled and tapped to accept a male rod end, it can have machined threads on the end to accept a female rod end, or it can be crossed dr led on one end to be secured by a bolt or a pin.

The pipe 210 can be made out of a variety of materials known to one skilled in the art, for example, the pipe 210 can be made out of a metal or composite material. The pipe 210 can be attached via a variety of methods known to one skilled in the art, for example, a full length bolt can be used through the pipe 210 exposing threads that can be attached to a female rod end, the pipe 210 can be tapped to accept a male rod end (See FIG. 8), or the pipe 210 can be crossed drilled on one end to be secured with a bolt or a pin.

The upper arm 160, lower arm 140, and slider 200 may be defined by a variety of shapes known to one skilled in the art, for example, circular, rectangular, square, or triangular.

Figure 10:
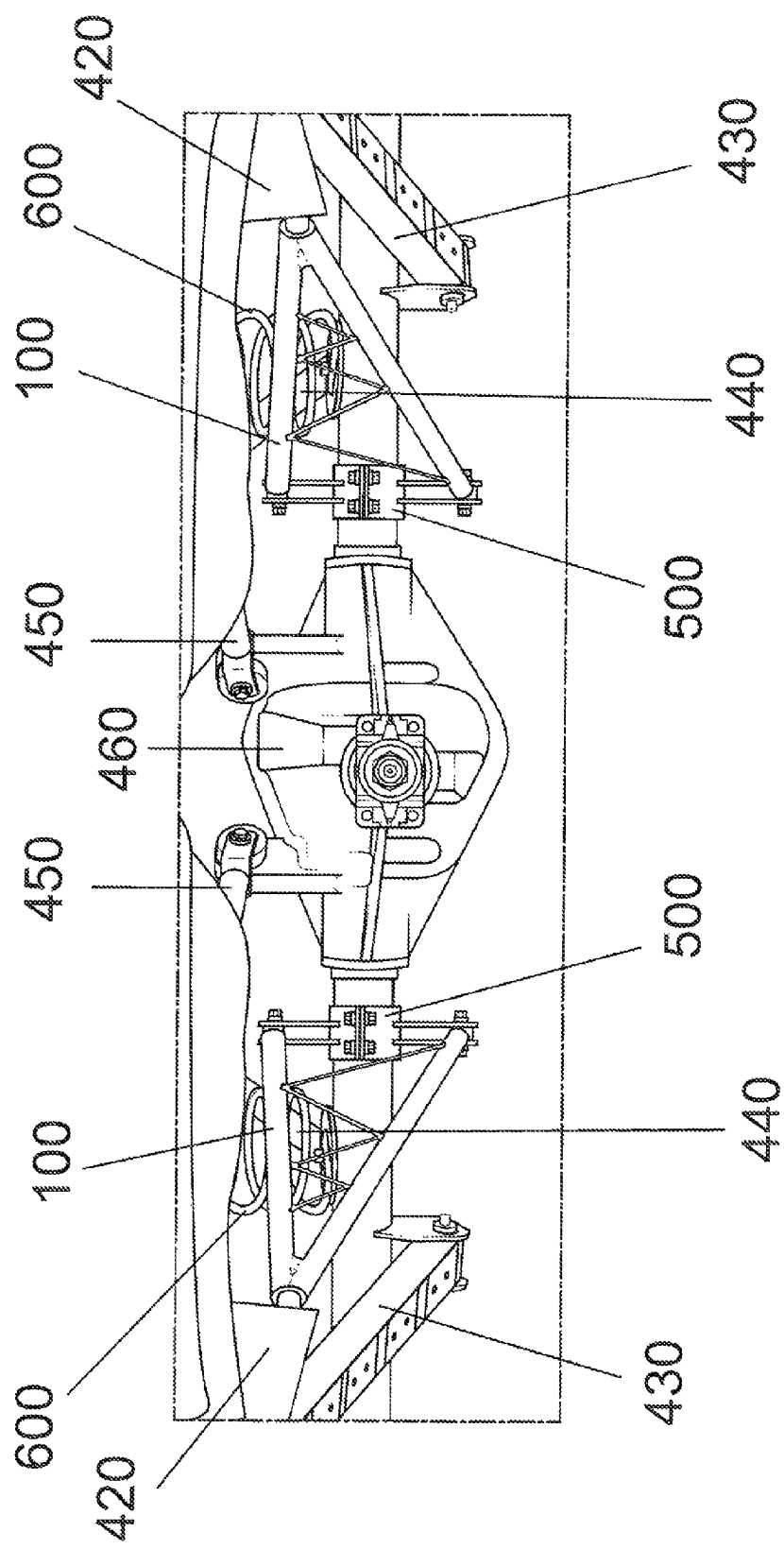
FIG. 10 is a front view of one embodiment of the traction bars employed on a vehicle.

FIG. 10 depicts one embodiment of a vehicle with traction bars installed. Suitably, two traction bars 100 are attached to the rear axle housing 400 and vehicle frame 410 via attachment brackets 420.

Operably, the traction bar 100 may work with a variety of suspensions known in the art, such as a 4-link suspension, 4-point suspension, or a leaf spring suspension.

In one embodiment, the traction bar 100 is an apparatus for vehicles, which is comprised of a V-shaped frame 110, an upper arm 130, a lower arm 140, and a slider 200. The traction bar 100 has a point end 120 with an opening. The upper arm 130 and lower arm 140 form a forked end, and the upper arm 130 and lower arm 140 each have a forked end fastener 150. The traction bar 100 has a slider 200, which has a fastening end 300. The traction bar's 100 slider 200 has a pipe 210 that has a smaller circumference than the point end 120. The traction bar's 100 slider 200 is coaxially disposed into the opening of the V-shaped frame's 110 point end 120. A portion of the slider 200 moves within and along the upper arm 130 of the V-shaped frame 110. The slider's 200 pipe 210 has a first end that is threaded on the inside. The slider's 200 fastening end 300 features a fastener receiving end 310 that receives a rigid fastener, which includes, but is not limited to screws and nuts and bolts. The slider's 200 fastening end 300 features a second end with a threaded rod 320, wherein the threaded rod 320 is threaded into the receiving threaded first end of the pipe 210. The upper arm 130 of the forked end is situated and fixed higher than where the point end 120 and slider 200 are situated.

This description enables a person skilled in the art to make an use the invention. It should be noted that the above description and recited embodiments or examples are of illustrative importance only. In other words, the appended drawings illustrate only typical embodiments of this invention, are not to scale, and therefore the descriptions of the present disclosure should not be construed as limiting of the subject matter in this application. Additional modifications may become apparent to one skilled in the art after reading this disclosure.

I claim:

1. A traction bar of a vehicle with a frame, a rear axle housing, and a suspension that permits relative motion between the axle housing and frame, said traction bar comprised of:
   a v-shaped frame with an upper arm and a lower arm that define a forked end and a point end of the v-shaped frame, wherein the forked end of the v-shaped frame is mechanically coupled to the vehicle's rear axle housing;
   a slider that is fixedly coupled to the frame of the vehicle and telescopically coupled to the upper arm at the point end of the v-shaped frame;
   wherein a portion of said slider telescopes along the upper arm of the v-shaped frame during upward or downward relative motion between the vehicle's frame and axle housing; and,
   wherein the lower arm restricts rotational motion of the vehicle's axle housing relative to the vehicle's frame.

2. The traction bar of claim 1 wherein said point end features an opening.

3. The traction bar of claim 2 wherein said upper arm and lower arm have fastening ends at the forked end of the v-shaped frame.

4. The traction bar of claim 3 wherein said slider is further defined by a fastening end.

5. The traction bar of claim 4 wherein said slider is further defined by a pipe,
   wherein the pipe is smaller in circumference than the point end opening.

6. The traction bar of claim 5 wherein said slider is coaxially disposed in the point end opening.

7. The traction bar of claim 6 wherein said pipe features a first end with an attachment means.

8. The traction bar of claim 7 wherein said attachment means features a fastener receiving end that receives a fastener.

9. The traction bar of claim 8 wherein said attachment means features a second end with a rod;
   wherein the said rod is received into the first end of the pipe.

10. The traction bar of claim 3 wherein the fastening end of said upper arm is fixed to a clamp that is coupled to the vehicle's axle housing so that the fastening end of the upper arm is vertically superior to said slider.

11. A method of restricting wheel hop during acceleration while allowing a vehicle's suspension to exhibit a full range of motion comprising the steps of:
   obtaining at least one traction bar for vehicles comprised of a v-shaped frame with an upper arm and a lower arm, wherein the v-shaped frame is defined by a forked end and a point end, and a slider, wherein the slider is coaxially disposed into the point end of the v-shaped frame; and,
   installing the forked end of at least one traction bar to an axle housing of the vehicle and the point end to a bracket attached to a vehicle's frame,
      wherein a portion of said slider telescopes along the upper arm of the v-shaped frame during upward or downward relative motion between the vehicle's frame and axle housing, and wherein the lower arm restricts rotational motion of the vehicle's axle housing relative to the vehicle's frame.

12. The method of claim 11 wherein said slider has an exposed length when a suspension coil is not compressed.

13. The method of claim 12 wherein said slider decreases in exposed length when a body of the vehicle is raised.

14. The method of claim 13 wherein said slider increases in exposed length when the suspension coil is compressed.

15. A method of restricting axle wrap during acceleration of a vehicle comprising the steps of:

obtaining at least one traction bar for vehicles comprised of a v-shaped frame with an upper arm and a lower arm, wherein the v-shaped frame is defined by a forked end and a point end, and a slider, wherein the slider is coaxially disposed into the point end of the v-shaped frame; and, installing the forked end of at least one traction bar to an axle housing and the point end to a bracket attached to a vehicle's frame, wherein a portion of said slider telescopes along the upper arm of the v-shaped frame during upward or downward relative motion between the vehicle's frame and axle housing, and wherein the lower arm restricts rotational motion of the vehicle's axle housing relative to the vehicle's frame.

\* \* \* \* \*